United States Patent
Andrew et al.

(10) Patent No.: US 6,246,798 B1
(45) Date of Patent: *Jun. 12, 2001

(54) MODIFIED DISCRETE WAVELET TRANSFORM FOR ODD LENGTH DATA APPROPRIATE FOR IMAGE AND VIDEO COMPRESSION APPLICATIONS

(75) Inventors: James Philip Andrew, Waverton; Andrew Peter Bradley, Castlecrag, both of (AU)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/161,399

(22) Filed: Sep. 28, 1998

(30) Foreign Application Priority Data

Sep. 29, 1997 (AU) .................................................. PO9511

(51) Int. Cl.⁷ ..................................................... G06K 9/36
(52) U.S. Cl. ........................................... 382/240; 382/249
(58) Field of Search ................................ 382/286, 240, 382/232, 248, 249, 250, 303, 304, 308; 348/420, 437, 438, 398

(56) References Cited

U.S. PATENT DOCUMENTS 5,966,465 * 10/1999 Keith et al. .......................... 382/232
5,999,656 * 12/1999 Zandi et al. .......................... 382/240

OTHER PUBLICATIONS

Hartenstein "Parametrization of discrete of discrete finite biorthogonal wavelets with linear phase" IEEE International Conf. on Acoustics, Speech, adn Signal Processing, 1997 vol. 3, pp2441–2444, Apr. 1997.*

Bi et al. "Fast odd–factor algorithm for discrete W transform" Electronic Letters vol. 34, pp 431–433, Mar. 1998.*

Bradley "A wavelet visible difference predictor" IEEE Trasaction on Image Processing vol. 8, pp 717–730, May 1999.*

Chan etal. "Fast algorithms for computing the discrete W transforms" IEEE Region 10 Conference on Computer and Communication Systems, 1990 vol. 1, pp. 183–185, Sep. 1990.*

Bruce, Andrew, et al., "Wavelet Analysis", IEEE Spectrum, Oct. 1996, pp. 26–35.

Stollnitz, Eric J., et al., "Wavelets for Computer Graphics: A Primer, Part 1", IEEE Computer Graphics and Applications, May 1995, pp. 76–84.

Stollnitz, Eric J., et al., "Wavelets for Computer Graphics: A Primer, Part 2", IEEE Computer Graphics and Applications, Jul. 1995, pp. 75–85.

* cited by examiner

Primary Examiner—Amelia M. Au
Assistant Examiner—Jingge Wu
(74) Attorney, Agent, or Firm—Fitzpatrick, Cella, Harper & Scinto

(57) ABSTRACT

A method of producing a transform decomposition of data having an odd length the method comprising the steps of dividing the data into a portion having an even length of one element; performing a discrete wavelet transform on the even length data to produce low frequency subband data and high frequency subband data; adding the difference of the one element and an adjacent element to high frequency subband data. Preferably the transform is a Discrete Wavelet Transform utilised in the compression of image data.

18 Claims, 4 Drawing Sheets

MODIFIED DISCRETE WAVELET TRANSFORM FOR ODD LENGTH DATA APPROPRIATE FOR IMAGE AND VIDEO COMPRESSION APPLICATIONS

FIELD OF THE INVENTION

The present invention relates to the field of digital compression with particular application to digital image compression. More particularly, the present invention discloses a modified discrete wavelet transform for odd length data appropriate for image and video compression applications.

BACKGROUND OF THE INVENTION

The field of digital data compression and in particular digital image compression has attracted great interest for some time.

In the field of digital image compression, many different techniques have been utilised. In particular, one popular technique is the JPEG standard which utilises the Discrete Cosine Transform to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent "lossless" compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics, reference is made to "Wavelets for Computer Graphics", I. Stollinitz et. al. published 1996 by Morgan Kaufmann Publishers, Inc.

Unfortunately, the standard techniques are normally ideally utilised on wavelet data having dimensions that are normally a binary power of 2. As such, this data represents an idealised case in that not all image data will be conveniently sized to be a power of 2 especially where multilevel Wavelet decompositions are carried out. Given that high degrees of compression are the objective, it is unclear how one should deal with image data that does not fit into a certain number of limited sizes.

SUMMARY OF THE INVENTION

It is an object of the present invention to ameliorate one or more disadvantages of the prior art.

In accordance with a first aspect of the present invention there is provided a method of producing a transform decomposition of data having an odd length, the method comprising the steps of (i) dividing the data into a portion having an even length and an odd length of one element; (ii) performing a discrete wavelet transform on the even length data to produce low frequency subband data and high frequency subband data; (iii) adding the difference of the one element and an adjacent element to the high frequency subband data.

In accordance with a second aspect of the present invention there is provided a method of producing an inverse transform composition of data, where said data includes low frequency subband data values, high frequency subband data values and a difference data value, the method including the steps of: (i) performing an inverse discrete wavelet transform on the low frequency subband data values and the high frequency subband data values to produce original data values; (ii) adding the difference data value to one of said original data values to produce a further original data value; and (iii) appending to the original data values said further original data value.

In accordance with a third aspect of the present invention there is provided an apparatus for producing a transform decomposition of data having an odd length, said apparatus including: means for dividing the data into a portion having an even length and an odd length of one element; means for performing a discrete wavelet transform on said even length data to produce low frequency subband data and high frequency subband data; means for adding the difference of said one element and an adjacent element to the high frequency subband data.

In accordance with a fourth aspect of the present invention there is provided an apparatus for producing an inverse transform composition of data, where said data includes low frequency subband data values, high frequency subband data values and a difference data value, the apparatus including: means for performing an inverse discrete wavelet transform on the low frequency subband data values and the high frequency subband data values to produce original data values; means for adding the difference data value to one of said original data values to produce a further original data value; and means for appending to the original data values said further original data value.

In accordance with a fifth aspect of the present invention there is provided a computer program product including a computer readable medium having recorded thereon a computer program for producing a transform decomposition of data having an odd length, the computer program product including: means for dividing the data into a portion having an even length and an odd length of one element; means for performing a discrete wavelet transform on said even length data to produce low frequency subband data and high frequency subband data; means for adding the difference of said one element and an adjacent element to the high frequency subband data.

In accordance with a sixth aspect of the present invention there is provided a computer program product including a computer readable medium having recorded thereon a computer program for producing an inverse transform composition of data, where said data includes low frequency subband data values, high frequency subband data values and a difference data value, the computer program product including: means for performing an inverse discrete wavelet transform on the low frequency subband data values and the high frequency subband data values to produce original data values; means for adding the difference data value to one of said original data values to produce a further original data value; and means for appending to the original data values said further original data value.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

Figure 1:
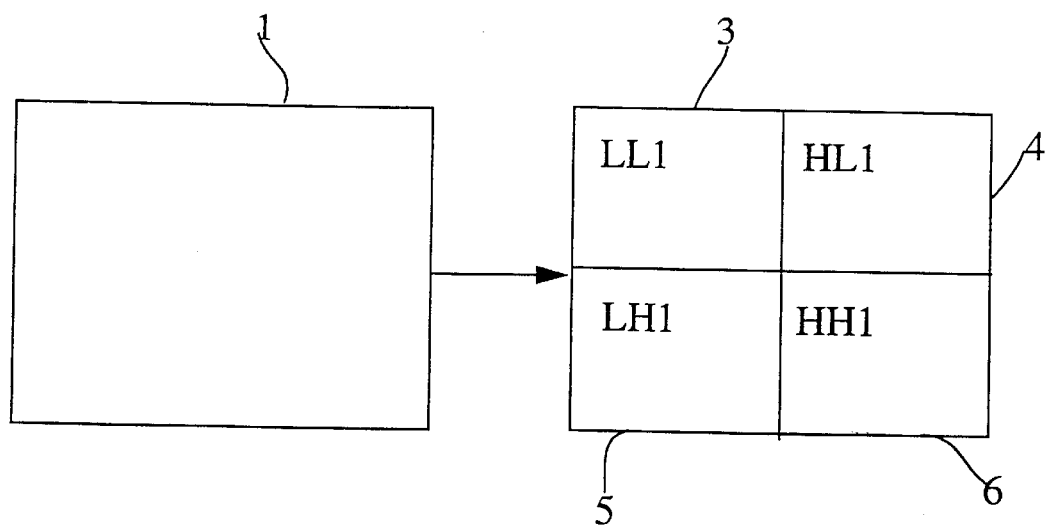
FIGS. 1–3 illustrate the process of wavelet transforming image data.

The preferred embodiment proceeds initially by means of a wavelet transform of image data. A description of the wavelet transform process is given in many standard texts and in particular the aforementioned book by Stollnitz et. al. An overview of the wavelet process will now be described with reference to FIGS. 1 to 3 of the accompanying drawings. Referring initially to FIG. 1, an original image 1 is transformed utilising a Discrete Wavelet Transform (DWT) into four subimages 3–6. The subimages or subbands are normally denoted LL1, HL1, LH1 and HH1. The "1" suffix on the subband names indicates level 1. The LL1 subband is a lowpass decimated version of the original image.

Figure 2:
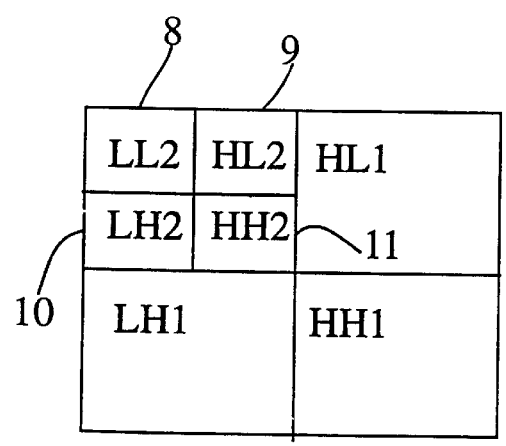
Figure 3:
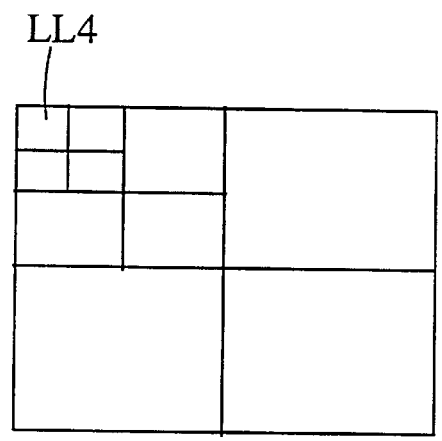

The wavelet transform utilised can vary and can include, for example, Haar basis functions, Daubechies basis functions etc. The LL1 subband is then in turn utilised and a second Discrete Wavelet Transform is applied, as shown in FIG. 2, giving subbands LL2 (8), HL2 (9), LH2 (10), HH2 (11). This process is continued for example as illustrated in FIG. 3 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image. Thus a J-level DWT can be inverted as a series of J-single level inverse DWT's.

Coding the image hierarchically can proceed by coding the DC subband. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

In an average image, the encoded subbands normally contain the "detail" information in an image. Hence, they often consist of a sparse array of values and substantial compression can be achieved by quantisation of the subbands and efficient encoding of their sparse matrix form.

It will be evident that the building block of the two-dimensional DWT is the single level one-dimensional DWT which operates on even length signals. To transform an image that has an odd dimension, or a sub-image (ie. the LL1 subband) with an odd-dimension, it is necessary to modify the usual one-dimensional DWT to handle an odd length signal or to extend the appropriate image dimension so that it is even.

The usual practice is the latter approach, that is to pad the each odd length one-dimensional signal by one sample (or more) to give an even length signal, prior to transformation. This is an artificial operation since a new signal has been created to represent the original signal, and further it is redundant since the new signal is longer than the original. This can lead to poorer end results of the compression process.

Figure 4:
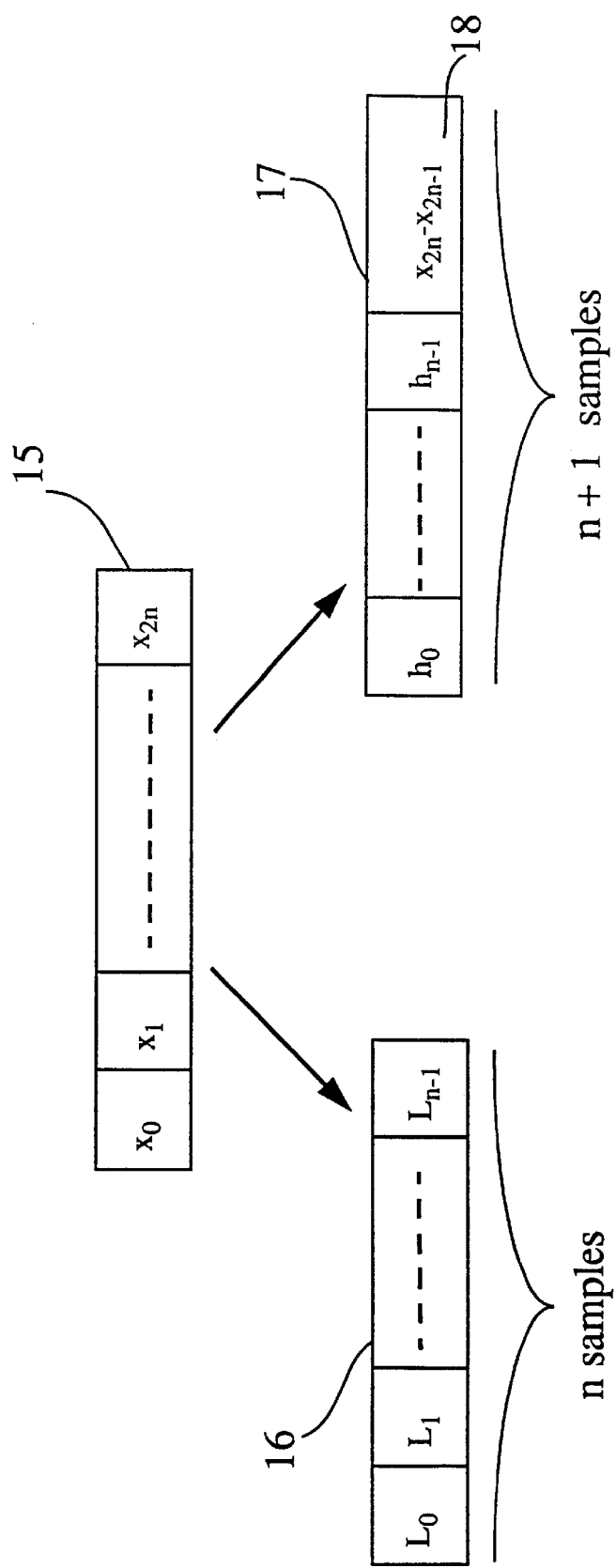
FIG. 4 illustrates the process of wavelet decomposition in accordance with the preferred embodiment.
Figure 5:
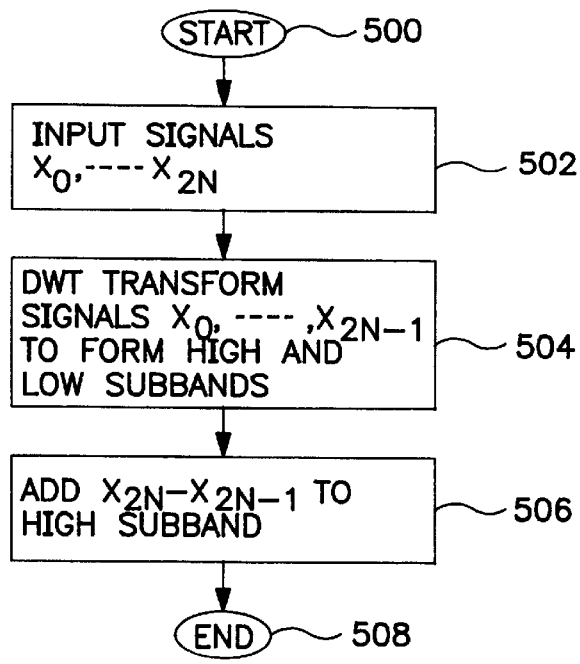
FIG. 5 is a flow chart of a method of transforming odd length data in accordance with the preferred embodiment.

FIG. 5 is a flow chart of the method of transforming odd length data as shown in FIG. 4. The processing commences at step 500. In the next step 502, an odd length signal having data values $X_0 \ldots X_{2N}$ (15) is input. In step 504, a DWT transform is applied to the first 2N samples ($X_0 \ldots X_{2N-1}$) so as to produce a lowpass subband $L_0 \ldots L_{N-1}$ (16) and a highpass band $H_0 \ldots H_{N-1}$ (17). In the next step 506, the difference of $X_{2N}-X_{2N-1}$ is added at the end of the highpass subband 17 giving a highpass signal $\{h_0, \ldots h_{N-1}, (x_{2N}-x_{2N-1})\}$ 18 of length N+1 samples. The processing terminates at step 508.

Figure 6:
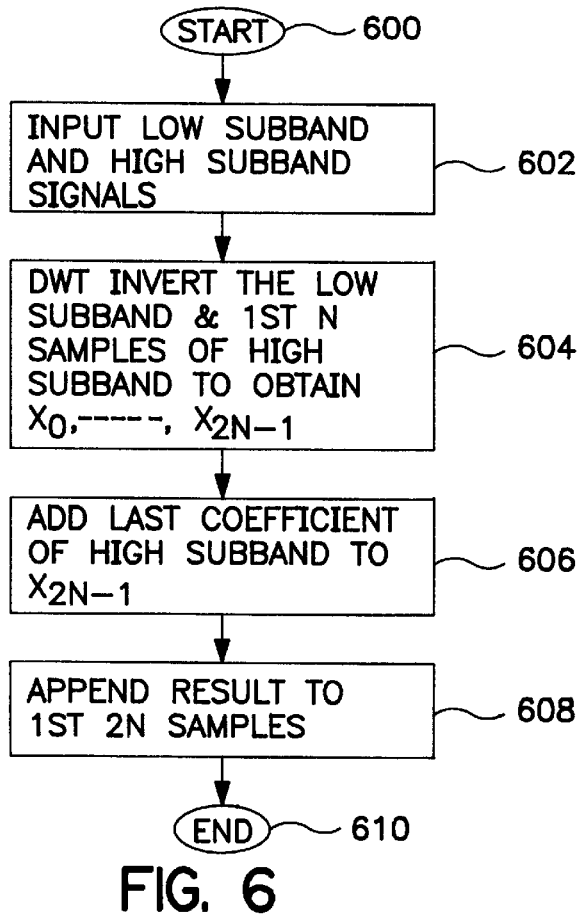
FIG. 6 is a flow chart of a method of inverse transforming an odd length data, in accordance with the preferred embodiment, which data has been transformed according to the method described with reference to FIG. 5.

FIG. 6 is a flow chart of a method of inverse transforming an odd length data, which has been transformed according to the method described with reference to FIG. 5. The processing commences at step 600 and the low pass signal 16 and the high pass signals are input. In the next step 604, the lowpass signal 16 and the first N samples of the highpass signal 17 are inverted with the usual inverse DWT to obtain the first 2N samples $\{x_0, \ldots x_{2N-1}\}$ of the original signal 15. In the next step 606, the last sample of the highpass signal is added to the coefficient $X_{2N-1}$, that is $(X_{2N}-X_{2N-1})+X_{2N-1}=X_{2N}$. In the next step 608, the result is appended to the first 2N samples of the inverted signal to give $\{X_0, \ldots, X_{2N-1}, X_{2N}\}$, which is the original signal.

There are several advantages of the approach of the preferred embodiment. Firstly, using a one dimensional DWT that operates on even length signals, this modified approach can be easily implemented to handle odd length signals. Thus even and odd length signals can be transformed without significant extra complexity. Further, in the modified DWT, the differencing of the last two samples is a crude form of highpass filtering. Thus this difference will have essentially the same characteristics as the other highpass samples 17, and will typically be of low magnitude. Thus the resulting highpass signal can be effectively compressed as a homogenous highpass signal (in as much as highpass signals are homogeneous).

Further, the differencing is an open loop operation, which in the presence of quantisation noise could potentially lead to large errors. However, since the DWT operates recursively only on the lowpass subband, there is no feedback to allow the open loop operation to magnify the error. Any extra error is confined to this difference sample and in this case it is not significantly greater than would otherwise be the case. Thus this differencing can effectively employed with the DWT without risking significant quantisation error amplification.

The encoding of the discrete wavelet transform data can then proceed through the utilisation of the standard techniques. Experiments have demonstrated that the approach to the preferred embodiment often leads to significantly better results than other techniques such as copying samples to the lowpass subband.

2.1 Preferred Embodiment of Apparatus(s)

Figure 7:
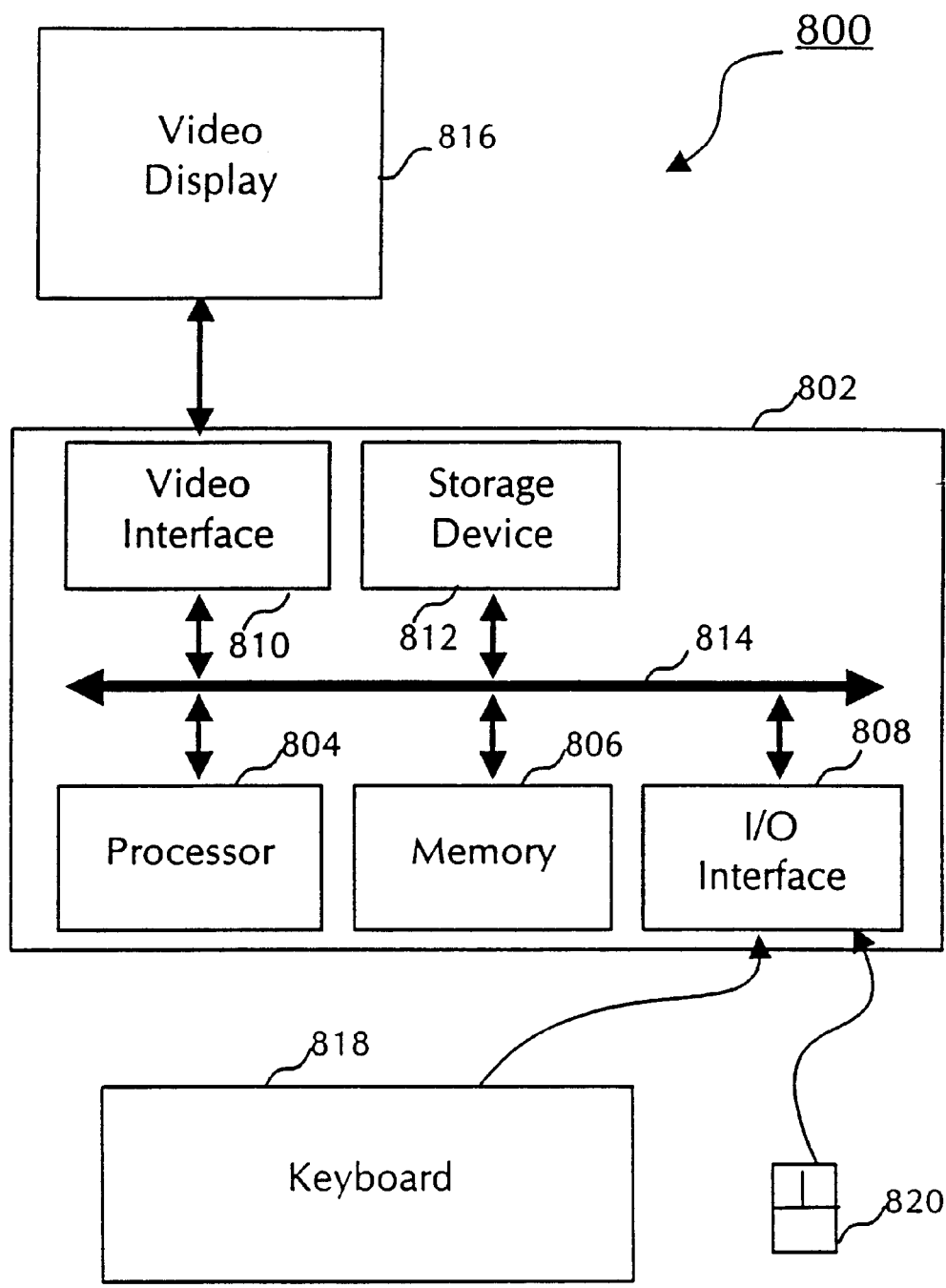
FIG. 7 is block diagram of a general purpose computer.

The encoding and/or decoding processes are preferably practiced using a conventional general-purpose computer, such as the one shown in FIG. 7, wherein the processes of FIG. 5 or 6 may be implemented as software executing on the computer. In particular, the steps of the encoding and/or decoding methods are effected by instructions in the software that are carried out by the computer. The software may be divided into two separate parts; one part for carrying out the encoding and/or decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding and/or decoding coded representations of digital images in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808c using an appropriate communication channel 830 such as a modem communications path, a computer network, or the like. The computer network may include a local area network (LAN), a wide area network (WAN), an Intranet, and/or the Internet The computer 802 itself consists of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The method of coding and/or decoding may alternatively be implemented in dedicated hardware such as one or more integrated circuits performing the functions or sub functions of the encoding and decoding. Such dedicated hardware may include graphic processors, digital signal processors, or one or more microprocessors and associated memories.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A method of producing a transform decomposition of data having an odd length, said method including the steps of:
    (i) dividing the data into a portion having an even length and an odd length of one element;
    (ii) performing a discrete wavelet transform on said even length data to produce low frequency subband data and high frequency subband data;
    (iii) adding the difference of said one element and an adjacent element to the high frequency subband data.

2. A method as claimed in claim 1 wherein said data comprises image data.

3. A method as claimed in claim 1, wherein said data of odd length consists of data values $X_0, \ldots, X_{2N}$, said even length portion consists of the data values $X_0, \ldots, X_{2N-1}$, said odd length portion consists of the data value $X_{2N}$ and said difference consists of $X_{2N}-X_{2N-1}$.

4. A method of producing an inverse transform composition of data, where said data includes low frequency subband data values, high frequency subband data values and a difference data value, the method including the steps of:
    (i) performing an inverse discrete wavelet transform on the low frequency subband data values and the high frequency subband data values to produce original data values;
    (ii) adding the difference data value to one of said original data values to produce a further original data value; and
    (iii) appending to the original data values said further original data value.

5. A method as claimed in claim 4, wherein said data comprises image data.

6. A method as claimed in claim 4, wherein said original data values consist of the data values $X_0, \ldots, X_{2N-1}$, the difference data value consists the value $X_{2N}-X_{2N-1}$, and the adding step includes adding $X_{2N}-X_{2N-1}+X_{2N-1}$ to produce said further original value $X_{2N}$.

7. An apparatus for producing a transform decomposition of data having an odd length, said apparatus including:
    means for dividing the data into a portion having an even length and an odd length of one element;

means for performing a discrete wavelet transform on said even length data to produce low frequency subband data and high frequency subband data;

means for adding the difference of said one element and an adjacent element to the high frequency subband data.

8. An apparatus as claimed in claim 7, wherein said data comprises image data.

9. An apparatus as claimed in claim 7, wherein said data of odd length consists of data values $X_0, \ldots, X_{2N}$, said even length portion consists of the data values $X_0, \ldots, X_{2N-1}$, said odd length portion consists of the data value $X_{2N}$ and said difference consists of $X_{2N}-X_{2N-1}$.

10. An apparatus for producing an inverse transform composition of data, where said data includes low frequency subband data values, high frequency subband data values and a difference data value, the apparatus including:

means for performing an inverse discrete wavelet transform on the low frequency subband data values and the high frequency subband data values to produce original data values;

means for adding the difference data value to one of said original data values to produce a further original data value; and means for appending to the original data values said further original data value.

11. An apparatus as claimed in claim 10, wherein said data comprises image data.

12. An apparatus as claimed in claim 10, wherein said original data values consist of the data values $X_0, \ldots, X_{2N-1}$, the difference data value consists the value $X_{2N}-X_{2N-1}$, and the adding step includes adding $X_{2N}-X_{2N-1}+X_{2N-1}$ to produce said further original value $X_{2N}$.

13. A computer program product including a computer readable medium having recorded thereon a computer program for producing a transform decomposition of data having an odd length, the computer program product including:

means for dividing the data into a portion having an even length and an odd length of one element;

means for performing a discrete wavelet transform on said even length data to produce low frequency subband data and high frequency subband data;

means for adding the difference of said one element and an adjacent element to the high frequency subband data.

14. A computer program product as claimed in claim 13, wherein said data comprises image data.

15. A computer program product as claimed in claim 13, wherein said data of odd length consists of data values $X_0, \ldots, X_{2N}$, said even length portion consists of the data values $X_0, \ldots, X_{2N-1}$, said odd length portion consists of the data value $X_{2N}$ and said difference consists of $X_{2N}-X_{2N-1}$.

16. A computer program product including a computer readable medium having recorded thereon a computer program for producing an inverse transform composition of data, where said data includes low frequency subband data values, high frequency subband data values and a difference data value, the computer program product including:

means for performing an inverse discrete wavelet transform on the low frequency subband data values and the high frequency subband data values to produce original data values;

means for adding the difference data value to one of said original data values to produce a further original data value; and means for appending to the original data values said further original data value.

17. A computer program product as claimed in claim 16, wherein said data comprises image data.

18. A computer program product as claimed in claim 16, wherein said original data values consist of the data values $X_0, \ldots, X_{2N-1}$, the difference data value consists the value $X_{2N}-X_{2N-1}$, and the adding step includes adding $X_{2N}-X_{2N-1}+X_{2N-1}$ to produce said further original value $X_{2N}$.

* * * * *

UNITED STATES PATENT AND TRADEMARK OFFICE
CERTIFICATE OF CORRECTION

PATENT NO. : 6,246,798 B1  Page 1 of 1
DATED : June 12, 2001
INVENTOR(S) : James Philip Andrew et al.

It is certified that error appears in the above-identified patent and that said Letters Patent is hereby corrected as shown below:

<u>Title page,</u>
Item [56], References Cited, OTHER PUBLICATIONS,
After Hartenstein, "of discrete" (2nd occurrence) should be deleted;
"adn" should read -- and --; and
"Chan etal." should read -- Chan et al. --.

<u>Column 4,</u>
Line 49, "effectively" should read -- effectively be --.

<u>Column 5,</u>
Line 24, "Internet" should read -- Internet. --

Signed and Sealed this

Ninth Day of April, 2002

*Attest:*

JAMES E. ROGAN
*Attesting Officer*    *Director of the United States Patent and Trademark Office*